United States Patent
Rizzi et al.

(10) Patent No.: US 11,625,240 B1
(45) Date of Patent: Apr. 11, 2023

(54) GENERATING RULES FOR MIGRATING DEPENDENCIES OF A SOFTWARE APPLICATION

(71) Applicant: RED HAT, INC., Raleigh, NC (US)

(72) Inventors: Marco Rizzi, Milan (IT); Paolo Antinori, Milan (IT)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 17/487,805

(22) Filed: Sep. 28, 2021

(51) Int. Cl.
  *G06F 8/71* (2018.01)
  *G06F 8/41* (2018.01)
  *G06F 8/73* (2018.01)

(52) U.S. Cl.
  CPC ............ *G06F 8/71* (2013.01); *G06F 8/433* (2013.01); *G06F 8/436* (2013.01); *G06F 8/447* (2013.01); *G06F 8/73* (2013.01)

(58) Field of Classification Search
  CPC . G06F 8/71; G06F 8/433; G06F 8/436; G06F 8/447; G06F 8/73
  USPC ................................................. 717/170, 171
  See application file for complete search history.

(56) References Cited

U.S. PATENT DOCUMENTS

| | | | |
|---|---|---|---|
| 7,117,486 B2 | 10/2006 | Wong et al. | |
| 7,367,027 B1* | 4/2008 | Chen | H04L 12/66 707/999.203 |
| 8,522,207 B1 | 8/2013 | Whittington et al. | |
| 9,785,421 B1* | 10/2017 | Neatherway | G06F 8/77 |
| 10,162,610 B2 | 12/2018 | Apte et al. | |
| 11,385,882 B2* | 7/2022 | Pal | G06F 8/72 |
| 11,467,824 B2* | 10/2022 | Yang | G06F 8/71 |
| 2002/0199170 A1* | 12/2002 | Jameson | G06F 8/54 717/120 |
| 2011/0209133 A1* | 8/2011 | Mahajan | G06F 8/65 717/170 |
| 2012/0054731 A1* | 3/2012 | Aravamudan | G06F 8/63 717/170 |
| 2018/0336503 A1 | 11/2018 | Kushida et al. | |

(Continued)

FOREIGN PATENT DOCUMENTS

IN    202021008655    2/2020

OTHER PUBLICATIONS

Title: Comparing software architecture recovery techniques using accurate dependencies, author: T Lutellier et al, published on 2015.*

(Continued)

*Primary Examiner* — Chameli Das
(74) *Attorney, Agent, or Firm* — Kilpatrick Townsend & Stockton LLP

(57) ABSTRACT

Rules can be generated for migrating dependencies of a software application. For example, a computing device can receive a source version of a dependency of a software application and a target version of the dependency of the software application. The computing device can compare the source version to the target version to determine a difference between the source version and the target version. The computing device can receive a template for a rule indicating a location in the source version to be modified for the software application to support the target version. The template can include a fillable section. The computing device can populate the fillable section of the template with a value based on the difference between the source version and the target version.

20 Claims, 3 Drawing Sheets

(56) References Cited

U.S. PATENT DOCUMENTS

| | | | |
|---|---|---|---|
| 2019/0303108 A1* | 10/2019 | Fu | G06N 7/005 |
| 2020/0264919 A1* | 8/2020 | Vukovic | H04L 67/34 |
| 2022/0027778 A1* | 1/2022 | Kochura | G06F 11/3466 |
| 2022/0156456 A1* | 5/2022 | Gadiya | G06V 30/418 |

OTHER PUBLICATIONS

Title: What do package dependencies tell US about semantic versioning? Auhor: A Decan, Published on 2019.*
Title: Dependency versioning in the wild author: J Dietrich, published on 2019.*
Title: Generating typed dependency parses from phrase structure parses. Author: MC De Marneffe, , published on 2006.*
Ossher et al., "Astra: Bottom-up Construction of Structured Artifact Repositories", https://ieeexplore.ieee.org/document/6385100?source=IQplus, Donald Bren School of Information and Computer Sciences, University of California, USA, 2012, 10 pages.
Ossher et al., "Astra: Bottom-up Construction of Structured Artifact Repositories", https://ieeexplore.ieee.org/documents/6385100?source=IQplus, 2010, 11 pages.
Silva et al., "RefDiff: Detecting Refactorings in Version Histories", https://arxiv.org/abs/1704.01544, Department of Computer Science Universidade Federal de Minas Gerais, Belo Horizonte, Brazil, Apr. 5, 2017, 11 pages.

* cited by examiner

GENERATING RULES FOR MIGRATING DEPENDENCIES OF A SOFTWARE APPLICATION

TECHNICAL FIELD

The present disclosure relates generally to dependencies of software applications. More specifically, but not by way of limitation, this disclosure relates to generating rules for migrating dependencies of a software application.

BACKGROUND

It has become commonplace for developers to continue to develop and provide updates for (e.g., new versions of) software over time. For example, developers may provide updates over time that add features to the software or remove existing features from the software. New software may also be created that has similar functionality to older software. A user may wish to replace the existing software in a computing environment with such updates or new software. This process of switching from a first piece of software to a second piece of software in a computing environment is often referred to as migration. In some cases, migration can involve switching from a first piece of software to a second piece of software, where the first piece of software and the second piece of software are different versions of the same piece of software.

Migration may rely on a set of rules to analyze or implement a target migration process. The rules can be configured for detecting certain conditions associated with the target migration process and flagging them for the user. This may assist the user in identifying problems with the target migration process, either preemptively before the migration process has begun or after the migration process has begun.

DETAILED DESCRIPTION

Figure 1:
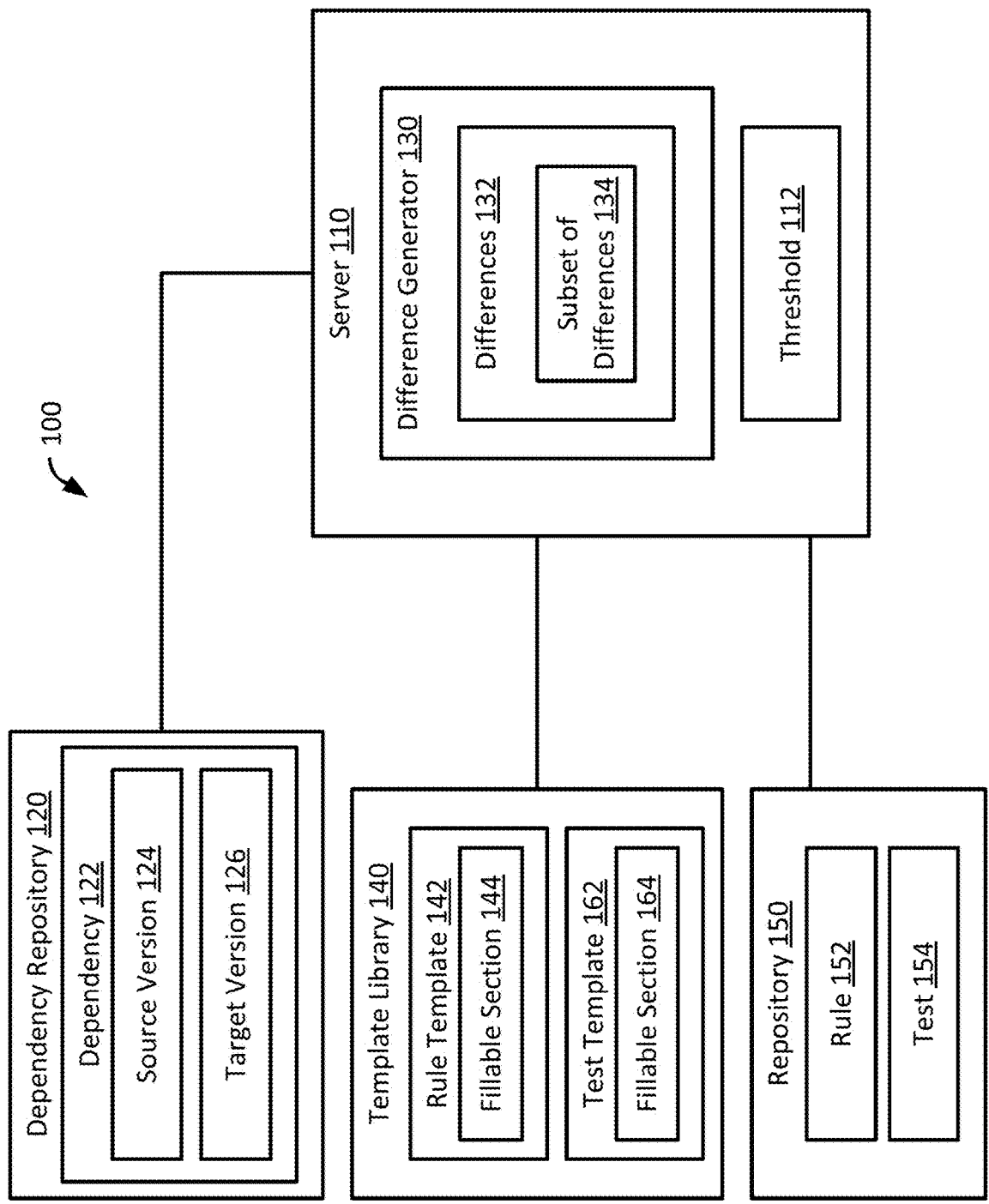
FIG. 1 is a block diagram of an example of a system for implementing generating rules for migrating dependencies of a software application according to some aspects of the present disclosure.

A software application often relies on other programs to perform tasks of the software application. The other programs, which may be a single file or a library of files, can be referred to as dependencies of the software application. Over time, an update to a dependency can be generated and released to a repository accessible by the software application. It may be desirable for the software application to upgrade to using the latest version of the dependency. But, if there are differences between the current version and the latest version, the software application may not adopt the latest version. Software developers often manually generate rules for upgrading dependencies, but the manual generation of rules may be time consuming and error-prone. Additionally, over time, technical debt associated with upgrading dependencies tends to get worse and harder to solve, which can affect performance improvements, security fixes, and new features in the latest version of a dependency.

Some examples of the present disclosure can overcome one or more of the abovementioned problems by providing a system that can automatically generate rules for transitioning from a source version of a dependency of a software application to a target version of the dependency. The system can receive the source version and the target version and compare the source version to the target version to determine a difference between the source version and the target version. The difference may include semantic information about the source version and the target version. The system can receive a template for a rule indicating a location in the source version to be modified for the software application to support the target version. The template can include a fillable section. The system can populate the fillable section of the template with a value based on the difference between the source version and the target version. The rule may be included in a report that can be output to a user. The report can indicate to the user the difference, the location of the difference, and how the source version can be modified so that the software application can support the target version.

As an example, a software application can currently use version A of a dependency. Version B of the dependency can then be added to a repository. A computing device can receive version A and version B and compare version A and version B to determine that a method has been added to version B that is not included in version A. The computing device can also determine information about the method during the comparison. The information may include a name of the method, a description of the method, or other properties associated with the method. The computing device can then receive a template of a rule for transitioning the software application from using version A to using version B. The computing device can populate a fillable section of the template with some or all of the information about the method to create the rule. The automatic generation of rules can be less time consuming and include fewer errors than manual generation of rules.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for implementing generating rules for migrating dependencies of a software application according to some aspects of the present disclosure. The system 100 can include a server 110 in communication with a dependency repository 120, a template library 140, and a repository 150. Each of these components may be local to or remote from each other. The server 110 can include a difference generator 130, or the difference generator 130 may be remote from and accessible by the server 110. The server 110 may communicate with the dependency repository 120, the difference generator 130, the template library 140, and the repository 150, over a network, such as a local area network (LAN) or the internet.

In some examples, the server 110 can receive a source version 124 and a target version 126 of a dependency 122 of a software application. The source version 124 and the target version 126 may be Maven-based Java artifacts. The server 110 can receive the source version 124 and the target version 126 of the dependency 122 from the dependency repository

120. The dependency repository 120 can be a Maven repository. The source version 124 can be a version of the dependency 122 currently used in the software application and the target version 126 can be a revised, or updated, version of the dependency 122. The source version 124 and the target version 126 can be binary files of compiled code. Differences between the source version 124 and the target version 126 may lead to issues with compiling or running the software application. Thus, identifying and mitigating the differences can allow the target version 126 to be used effectively in the software application.

The difference generator 130 of the server 110 can compare the source version 124 to the target version 126 to determine one or more differences 132 between the source version 124 and the target version 126. The difference generator 130 can be language specific based on a programming language of the source version 124 and the target version 126. For example, if the source version 124 and the target version 126 are in the Java programming language, the difference generator 130 may be RevAPI. The differences 132 can be changes, such as additions, removals, or revisions, to portions of the code in the target version 126 compared to the source version 124. The differences 132 may include semantic information about the source version 124 and the target version 126. Examples of the semantic information can include names of elements of the source version 124 or the target version 126, names of functions included in the source version 124 or the target version 126, etc.

The difference generator 130 may additionally classify each difference of the differences 132 based on a severity of the difference. For example, the difference generator 130 may classify each of the differences 132 as breaking, potentially breaking, or non-breaking, where breaking differences can be considered the most severe and non-breaking differences can be considered the least severe. In addition, the classification may include an indication of compile-time incompatible differences and runtime incompatible differences. Compile-time incompatible differences can be considered more severe than runtime incompatible differences.

In some examples, upon determining the differences 132, the server 110 can receive a rule template 142 for each of the differences 132. The rule template 142 can indicate a location in the source version 124 that is to be modified for the software application to support the target version 126. In other words, the rule template 142 can indicate portions of code in the source version 124 that are different in the target version 126, and therefore indicate locations in the source version 124 that can be changed so that the software application can use the target version 126 of the dependency 122. The rule template 142 can include one or more fillable sections, such as fillable section 144, that can be populated based on the difference to generate a rule 152 for the difference. The rule 152 may be used in a report that can be presented to a user so that the user can implement the modifications. The server 110 can access the template library 140 and select the rule template 142 based on the difference, and the template library 140 may include different rule template for different types of differences. For example, information that is to be populated in the fillable sections may differ between rule templates. In some instances, specific markers in the differences 132 may correspond to a rule template that includes an if/else statement, or other granular rule definitions.

In an example, the rule template 142 may include multiple sections, such as a when block and a perform block. The when block can indicate a condition that is being searched for in the dependency 122. As a particular example, the condition may be a search for a class that references a toolbox at a location corresponding to an implements statement. The perform block can indicate how the difference is to be indicated to the user. For example, the perform block may indicate a hint is to be included in the report that indicates code that has been added in the target version 126. Each of the when block and the perform block can include one or more fillable sections. Each fillable section may be designated by a particular character or set of characters, such as by an open quotation mark immediately followed by a closed quotation mark. Other examples of rule templates may include different sections, different structures, or different designators for fillable sections.

The server 110 can populate the fillable section 144 with a value based on the difference. For example, the server 110 can extract the value from the differences 132 and then populate the fillable section 144 with the value. For example, the differences 132 may indicate a description associated with a difference, and the description can be populated in a fillable section for a title of a hint. Additionally, the rule template 142 may include fillable sections associated with an estimated effort of the user implementing the modifications, and a priority of implementing the modification. A message in the rule 152 that can be displayed to the user in the report can include a fillable section for a name of an added, removed, or revised element of code. The name can be extracted from the differences 132 output by the difference generator 130. For example, the name may be "method void com.acme.diy.Toolbox::addHammer ( )", and this name can be populated in a message of the rule template 142 such that the message indicates "'method void com.acme.diy.Toolbox::addHammer ( )' has been added".

In some examples, the server 110 may filter the differences 132 into a subset of differences 134 prior to receiving rule templates and generating rules for each of the differences 132. The filtering may be based on the classification of each of the differences 132. The server 110 may include differences with a severity above a threshold, or of a particular type, in the subset of differences 134. For example, differences classified as breaking, potentially breaking, or compile-time incompatible may be included in the subset of differences 134, whereas differences classified as non-breaking or runtime incompatible may be excluded from the subset of differences 134. The server 110 may generate rules for the subset of differences 134 and may not generate rules for the remaining differences. This can reduce a time involved in generating rules, since the server 110 may only generate rules for the differences determined to be most severe.

Upon the fillable section 144 being populated, the server 110 can receive a test template 162 for the rule 152. The test template 162 can correspond to a template for a unit test for the rule 152. Similar to the rule template 142, the test template 162 can include another fillable section 164. The server 110 can populate the fillable section 164 based on the difference and the rule 152. The server 110 can extract a value from the difference or the rule 152 to populate the fillable section 164.

In some examples, the server 110 can store the rule 152 and the test 154 in the repository 150. The rule 152 may then be included in the report along with other rules associated with the differences 132 between the source version 124 and the target version 126. The user may receive the report and modify the source version 124 accordingly so that the software application can support the target version 126. The repository 150 may be accessible by multiple users and multiple devices, such that a continuous integration (CI) and continuous delivery (CD) process can automatically open a pull request to the repository 150 and access the rules and the tests.

FIG. 1 is illustrative and non-limiting. Other examples may include more components, fewer components, different components, or a different arrangement of the components shown in FIG. 1. For example, although the server 110 includes the difference generator 130 in the example of FIG. 1, the difference generator 130 may be external to the server 110 in other examples. Additionally, the dependency repository 120, the template library 140, or the repository 150 may be local to the server in other examples.

Figure 2:
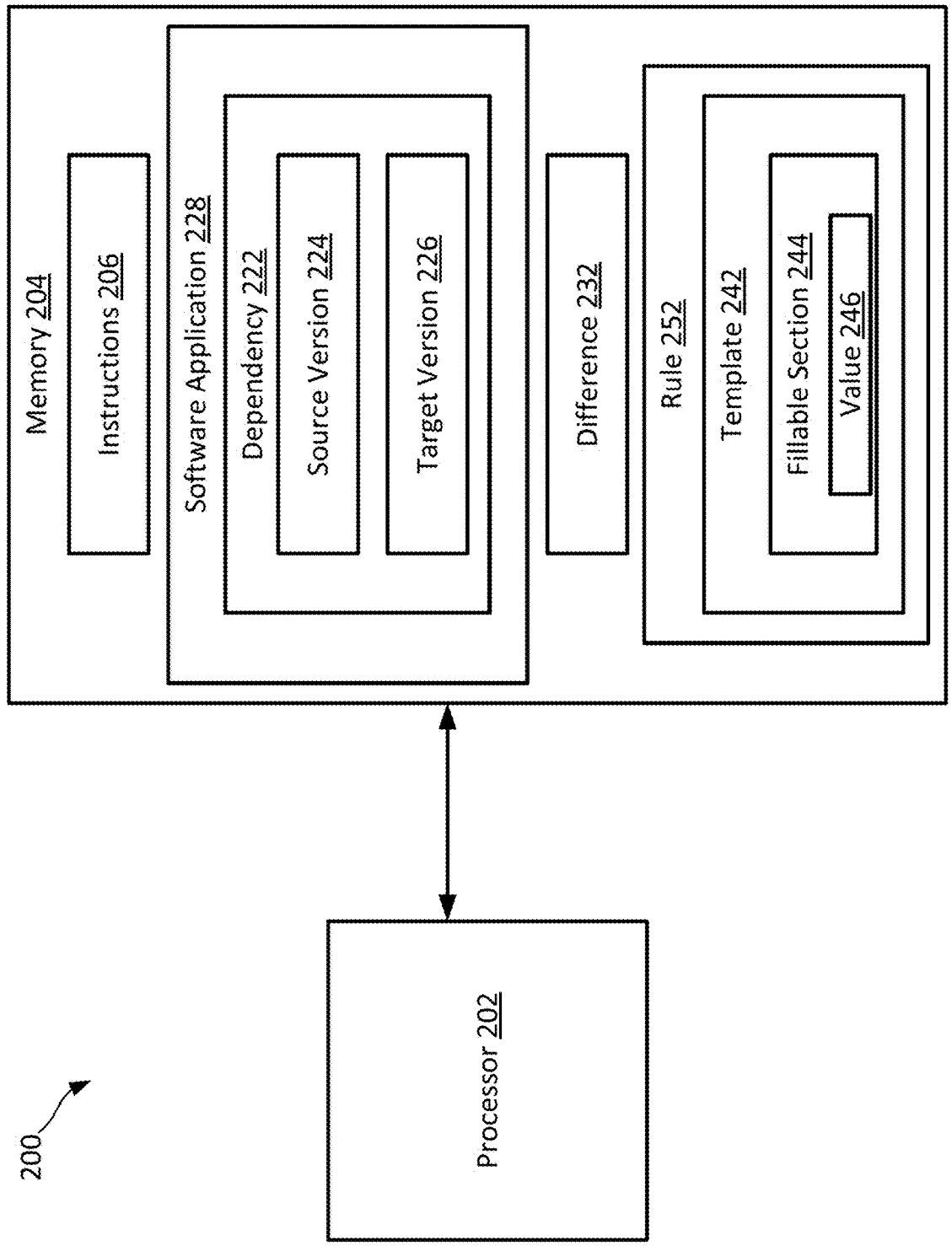
FIG. 2 is a block diagram of another system for implementing generating rules for migrating dependencies of a software application according to some aspects of the present disclosure.

FIG. 2 is a block diagram of another system 200 for implementing generating rules for migrating dependencies of a software application according to some aspects of the present disclosure. The system 200 includes a processor 202 that is communicatively coupled to a memory 204. The processor 202 and the memory 204 may be part of the server 110 in FIG. 1.

The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. The instructions 206 may include processor-specific instructions generated by a compiler or an interpreter from code written in any suitable computer-programming language, such as C, C++, C#, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory 204 can include a non-transitory computer-readable medium from which the processor 202 can read instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206.

In some examples, the processor 202 can execute the instructions 206 to perform operations. For example, the processor 202 can receive a source version 224 of a dependency 222 of a software application 228 and a target version 226 of the dependency 222 of the software application 228. The source version 224 and the target version 226 can be binary files of compiled code of the dependency 222. The processor 202 can compare the source version 224 to the target version 226 to determine a difference 232 between the source version 224 and the target version 226. The difference 232 can be semantic information about the source version 224 and the target version 226. The processor 202 can receive a template 242 for a rule 252 indicating a location in the source version 224 to be modified for the software application 228 to support the target version 226. The template 242 can include a fillable section 244. The processor 202 can populate the fillable section 244 of the template 242 with a value 246 based on the difference 232 between the source version 224 and the target version 226. Upon the fillable section 244 being populated, the server 110 can generate a report that can be output to a user to indicate to the user how the source version 224 is to be modified so the software application 228 can support the target version 226. Automating rule generation by using templates can reduce a time involved in creating rules and can reduce errors included in rules.

Figure 3:
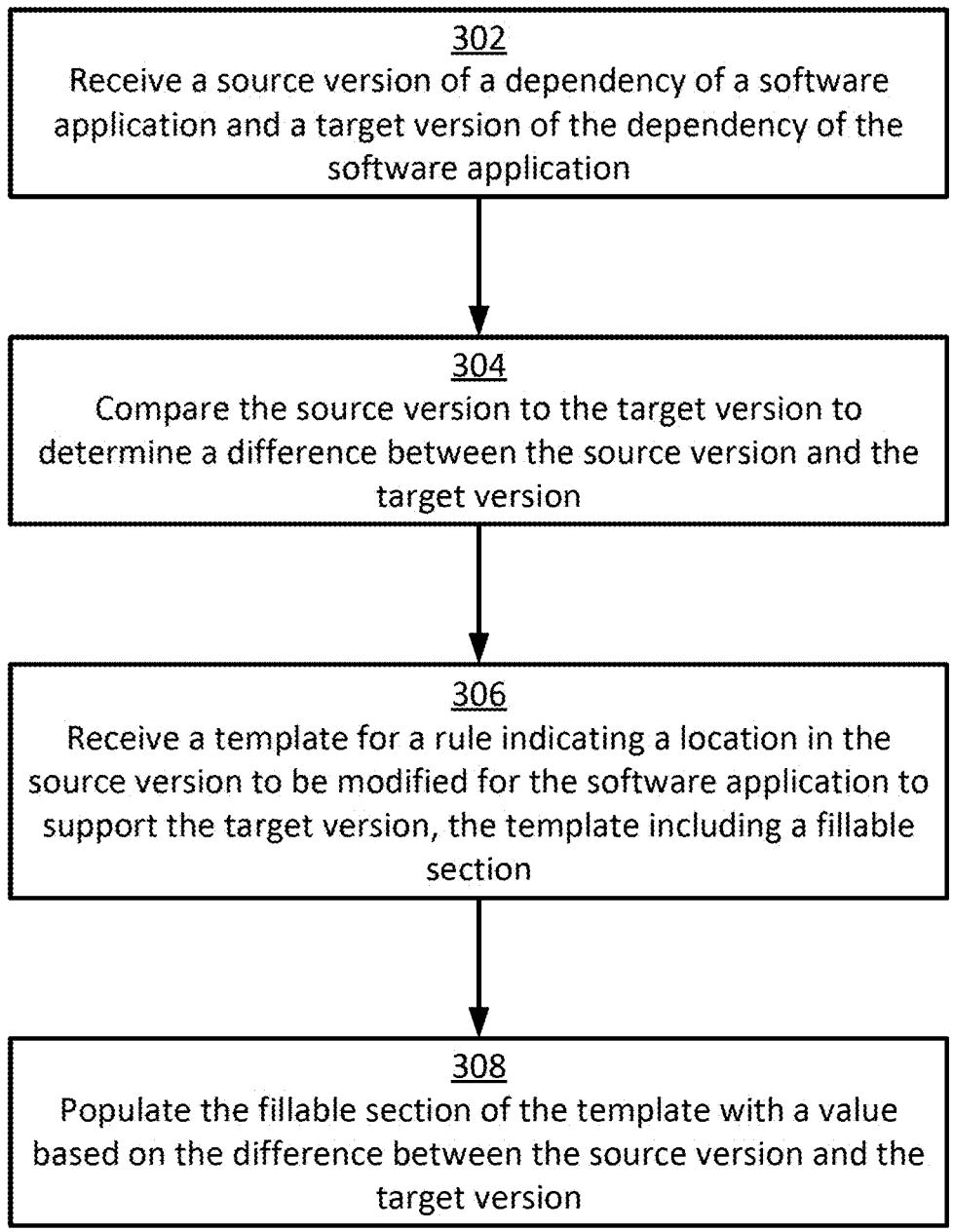
FIG. 3 is a flowchart of a process for implementing generating rules for migrating dependencies of a software application according to some aspects of the present disclosure.

FIG. 3 is a flowchart of a process for implementing generating rules for migrating dependencies of a software application according to some aspects of the present disclosure. The processor 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, the processor 202 receives a source version 224 of a dependency 222 of a software application 228 and a target version 226 of the dependency 222 of the software application 228. The source version 224 can be a first library of compiled binary files that is currently used by the software application 228. The target version 224 can be a second library of compiled binary files having additional files, fewer files, or changes to the first library of compiled binary files.

In block 304, the processor 202 compares the source version 224 to the target version 226 to determine a difference 232 between the source version 224 and the target version 226. The difference 232 can include semantic information about the source version 224 and the target version 226. The processor 202 can also classify the difference 232 based on a severity of the difference 232. In some examples, the processor 202 may identify multiple differences between the source version 224 and the target version 226 and classify each of the multiple differences based on the severity.

In block 306, the processor 202 receives a template 242 for a rule 252 indicating a location in the source version 224 to be modified for the software application 228 to support the target version 226. The template 242 can include a fillable section 244. The processor 202 can select the template 242 based on the difference 232, and a different template may be selected based on different markers in the semantic information. If the processor 202 identifies multiple differences, the processor 202 may filter the multiple differences based on the severity of each of the multiple differences. For example, the processor 202 may filter differences having a severity above a threshold into a subset of differences. The processor 202 may then receive a template for a rule for each of the differences in the subset of differences, and the processor 202 may not receive a template for a rule for differences excluded from the subset of differences.

In block 308, the processor 202 populates the fillable section 244 of the template 242 with a value 246 based on the difference 232 between the source version 224 and the target version 226. The value 246 may correspond to a name, description, or other indicator associated with an addition, removal, or revision of code as represented by the difference 232. The rule 252 may indicate text, or other output, that is to be included in a report to a user about how the source version 224 can be modified so that the software application 228 can support the target version 226 of the dependency 222. Automatically selecting and populating the template 242 to generate the rule 252 can reduce time involved in creating rules and improve stability of generated rules.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

What is claimed is:

1. A system comprising:
a processor; and
a memory including instructions that are executable by the processor for causing the processor to:
receive a source version of a dependency of a software application and a target version of the dependency of the software application, the dependency being used by the software application to perform one or more tasks of the software application;
compare the source version of the dependency to the target version of the dependency to determine a difference between the source version of the dependency and the target version of the dependency;
receive a template for a rule indicating a location in the source version of the dependency to be modified for the software application to support the target version of the dependency, the template including a fillable section;
populate the fillable section of the template with a value based on the difference between the source version of the dependency and the target version of the dependency; and
output a report including the rule and a modification for the source version of the dependency for the software application to support the target version of the dependency.

2. The system of claim 1, wherein the memory further includes instructions that are executable by the processor for causing the processor to:
determine a plurality of differences between the source version of the dependency and the target version of the dependency;
classify each difference of the plurality of differences based on a severity of the difference;
filter the plurality of differences into a subset of differences, the severity of each difference in the subset of differences being above a threshold; and
generate, for each difference of the subset of differences, the rule by populating the fillable section of the template based on the difference.

3. The system of claim 1, wherein the memory further includes instructions that are executable by the processor for causing the processor to select the template from a plurality of templates based on the difference between the source version of the dependency and the target version of the dependency.

4. The system of claim 1, wherein the memory further includes instructions that are executable by the processor for causing the processor to store the rule in a repository of rules subsequent to populating the fillable section of the template.

5. The system of claim 1, wherein the memory further includes instructions that are executable by the processor for causing the processor to generate a test for the rule by:
subsequent to populating the fillable section of the template, receiving a test template for the rule, the test template including an additional fillable section; and
populating the additional fillable section based on the rule.

6. The system of claim 5, wherein the memory further includes instructions that are executable by the processor for causing the processor to store the rule and the test for the rule in a repository.

7. The system of claim 1, wherein the difference comprises semantic information about the source version of the dependency and the target version of the dependency.

8. A method comprising:
receiving a source version of a dependency of a software application and a target version of the dependency of the software application, the dependency being used by the software application to perform one or more tasks of the software application;
comparing the source version of the dependency to the target version of the dependency to determine a difference between the source version of the dependency and the target version of the dependency;
receiving a template for a rule indicating a location in the source version of the dependency to be modified for the software application to support the target version of the dependency, the template including a fillable section;
populating the fillable section of the template with a value based on the difference between the source version of the dependency and the target version of the dependency; and
outputting a report including the rule and a modification for the source version of the dependency for the software application to support the target version of the dependency.

9. The method of claim 8, further comprising:
determining a plurality of differences between the source version of the dependency and the target version of the dependency;
classifying each difference of the plurality of differences based on a severity of the difference;
filtering the plurality of differences into a subset of differences, the severity of each difference in the subset of differences being above a threshold; and
generating, for each difference of the subset of differences, the rule by populating the fillable section of the template based on the difference.

10. The method of claim 8, further comprising:
selecting the template from a plurality of templates based on the difference between the source version of the dependency and the target version of the dependency.

11. The method of claim 8, further comprising:
storing the rule in a repository of rules subsequent to populating the fillable section of the template.

12. The method of claim 8, further comprising generate a test for the rule by:
subsequent to populating the fillable section of the template, receiving a test template for the rule, the test template including an additional fillable section; and
populating the additional fillable section based on the rule.

13. The method of claim 12, further comprising:
storing the rule and the test for the rule in a repository.

14. The method of claim 8, wherein the difference comprises semantic information about the source version of the dependency and the target version of the dependency.

15. A non-transitory computer-readable medium comprising program code that is executable by a processor for causing the processor to:
receive a source version of a dependency of a software application and a target version of the dependency of the software application, the dependency being used by the software application to perform one or more tasks of the software application;
compare the source version of the dependency to the target version of the dependency to determine a difference between the source version of the dependency and the target version of the dependency;
receive a template for a rule indicating a location in the source version of the dependency to be modified for the software application to support the target version of the dependency, the template including a fillable section;
populate the fillable section of the template with a value based on the difference between the source version of the dependency and the target version of the dependency; and
output a report including the rule and a modification for the source version of the dependency for the software application to support the target version of the dependency.

16. The non-transitory computer-readable medium of claim 15, further comprising program code that is executable by a processor for causing the processor to:
determine a plurality of differences between the source version of the dependency and the target version of the dependency;
classify each difference of the plurality of differences based on a severity of the difference;
filter the plurality of differences into a subset of differences, the severity of each difference in the subset of differences being above a threshold; and
generate, for each difference of the subset of differences, the rule by populating the fillable section of the template based on the difference.

17. The non-transitory computer-readable medium of claim 15, further comprising program code that is executable by a processor for causing the processor to select the template from a plurality of templates based on the difference between the source version of the dependency and the target version of the dependency.

18. The non-transitory computer-readable medium of claim 15, further comprising program code that is executable by a processor for causing the processor to store the rule in a repository of rules subsequent to populating the fillable section of the template.

19. The non-transitory computer-readable medium of claim 15, further comprising program code that is executable by a processor for causing the processor to generate a test for the rule by:
subsequent to populating the fillable section of the template, receiving a test template for the rule, the test template including an additional fillable section; and
populating the additional fillable section based on the rule.

20. The non-transitory computer-readable medium of claim 19, further comprising program code that is executable by a processor for causing the processor to store the rule and the test for the rule in a repository.

* * * * *